United States Patent Office 3,254,934
Patented June 7, 1966

3,254,934
PROCESS FOR THE COLORING OF HYDROPHOBIC MATERIALS
Max Schwarz and Winfried Kruckenberg, Leverkusen, Germany, assignors to Farbenfabriken Bayer Aktiengesellschaft, Leverkusen, Germany, a corporation of Germany
No Drawing. Filed Oct. 9, 1963, Ser. No. 314,888
18 Claims. (Cl. 8—4)

This application is a continuation-in-part of U.S. application Serial No. 117,271, filed on June 15, 1961, and now abandoned.

The invention relates to a new process for dyeing and padding of hydrophobic materials. More particularly it concerns the dyeing and padding of articles such as filaments, fibres, foils, ribbons and the like of hydrophobic materials such as aromatic polyesters, especially polyethylene terephthalates, synthetic polyamides and polyurethanes, polyacrylonitrile and its copolymerisates, cellulose esters and polyolefines, such as polyethylenes and polypropylenes, by contacting the materials to be colored consecutively first with an amino group containing carbocyclic compound, the nuclear portion of said compound being selected from the class consisting of:

(a) Two non-condensed aromatic carbocyclic six-membered rings;
(b) Two condensed aromatic carbocyclic six-membered rings;
(c) Three non-condensed aromatic carbocyclic six-membered rings;
(d) Three aromatic carbocyclic six-membered rings, two of which are condensed with each other;
(e) Four non-condensed aromatic carbocyclic six-membered rings;
(f) Three non-condensed carbocyclic six-membered rings, one of which is a hydroaromatic ring and the remaining nuclei are aromatic rings;
(g) Two non-condensed carbocyclic six-membered rings, one of which is a hydroaromatic ring and the other is an aromatic ring;

said compound having 2 to 5 amino groups at least two of which being in para position to each other, at least one of which is a primary amino group and the others are selected from the group consisting of primary and secondary amino groups.

The part of said compound which connects non-condensed ring portions being a member selected from the group consisting of

—NH—, —CH$_2$—, —O—, —CH=CH—, —CONH—,
—N=N— and a carbon-carbon bond.

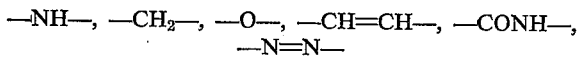

And subsequently with N-haloquinone-imines or N,N'-dihaloquinone-diimines.

It is an object of the invention to provide a valuable dyeing and padding process for hydrophobic materials, in particular of fibrous materials of aromatic polyesters such as polyethylene terephthalates. Another object is the provision of mainly dark colored, particularly black shades on hydrophobic materials and particularly on aromatic polyester fibrous materials. Still another object is the provision of aromatic polyesters which are colored black shades of excellent fastness properties, particularly outstanding fastness to light, sublimation and excellent fastness to rubbing and to wet processing. It is also an object of this invention to provide a process for dyeing and padding of hydrophobic materials especially of aromatic polyesters such as polyethylene terephthalates, which process can be carried out in a very simple manner by a two step process thus yielding mainly black shades of highly valuable fastness properties.

The above objects can be accomplished and valuable dyeings be produced on articles such as filaments, fibres, foils, ribbons and the like of hydrophobic materials such as aromatic polyesters and polycondensation products of 1,4-bis-(hydroxymethyl)-benzene and terephthalic acid, especially polyethylene terephthalates, synthetic polyamides and polyurethanes, polyacrylonitrile and its copolymerisates, cellulose esters and polyolefines such as polyethylenes and polypropylenes, when the materials to be dyed are first treated with the above-identified aromatic amino compounds or their salts, and subsequently with N-haloquinone-imines or N,N'-dihalo-quinone-diimines of optionally substituted quinones.

By all the aforesaid new processes mostly dark-colored, particularly black, dyeings are obtained which are distinguished by good general fastness properties, especially very good fastness to sublimation and light. The methods for the dyeings of aromatic polyesters especially those made from ethylene glycol and terephthalic acid, i.e. polyethylene terephthalates, or mixtures of terephthalic acid and sulfoisophthalic acid, or from 1,4-bis-(hydroxymethyl)-benzene and terephthalic acid (cf. Zeitschrift für die gesamte Textilindustrie, 1960, page 650; and Modern Textiles Magazine 39 (1958), page 31) are of particular interest.

Of the series of the above said aromatic compounds containing primary and/or secondary amino groups to be used according to the present process, the following substances may be mentioned among others: 4-amino-diphenylamine, 4-amino-4'-methoxy-diphenylamine, 3-methoxy - 4 - aminodiphenylamine, 4 - amino - 4' - cyclohexyldiphenylamine, 4 - amino - 4' - methyldiphenylamine, 4-amino - 4' - naphthyl - diphenylamine, 2,4-diaminodiphenylamine, 4 - benzoylamido - 2,5 - dimethoxy - 1 - aminobenzene, further the compounds

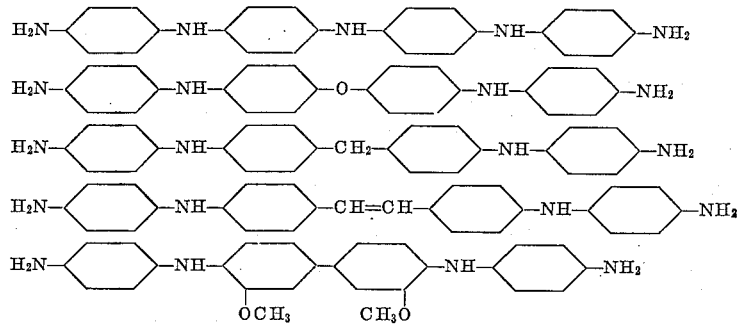

or their salts or mixtures thereof with primary and/or secondary mono- or polynuclear carbocyclic amino compounds of the above-indicated nature. The aforementioned compounds must contain at least one primary amino group.

As N-chloroquinone-imines or N,N'-dichloroquinone-diimines there may be used, in addition to unsubstituted chlorimines also mono- or dichlorimines further substituted in the quinoid nucleus by, for example, halogen such as chlorine or bromine, alkyl or alkoxy groups. Especially suitable components are for example 2,6-dichloro-4-mono- or -1,4-dichlorimino-benzoquinones of the formula

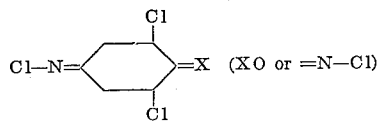

further 2,5-dichloro-N,N'-dichloro-p-benzoquinone-diimine, 2-chloro-N,N'-dichloro-p-benzoquinone-diimine, 2,5-dichloro-N-chloro-N'-acetyl-p-benzoquinone-diimine, N-chloro-N'-acetyl-p-benzoquinone-diimine, N - methyl-N'-chloro-p-benzoquinone - diimine, 2 - methyl - 4 - monochlorimino-p-benzoquinone, N,N'-dichloro-biphenylquinone- or 2-methyl-N,N'-dichloro-p-benzoquinone-diimine or naphthoquinone-1,4-dichloro-diimine.

Good results are also obtained by using mixtures of such quinone N-halo-imines.

The processes are carried out by applying the amino group-containing aromatic compounds and the haloimine compounds consecutively to the materials to be treated, for example fibres or fabrics, as neutral, acid or alkaline aqueous suspensions or solutions, preferably with the use of dispersing agents or emulsifiers, from a dyebath or padding liquor, in that the amines are first applied and subsequently the haloimine components. Depending on the kind of dyeing material, the components are applied to the material at room temperature or at an elevated temperature, and the temperature is raised in the course of the dyeing process whereby the optimum temperature may be up to 140° C. At temperatures below 100° C., it is sometimes advantageous to add conventional carrier substances such as trichlorobenzene, diphenyl, diphenyl ether or esters of aromatic carboxylic acids to the dyebath. The process is carried out for example by placing the dyeing material, for example fabrics or fibres of polyethylene terephthalate, initially at room temperature, into a dyebath or treating it with a padding liquor containing the amino group-containing components or mixtures of such components, an emulsifier and dispersing agent and, if necessary, reducing substances to preserve the aromatic bases from being oxidised by air; the treatment is then continued while slowly raising the temperature depending on the kind of material to be treated, preferably to 70–140° C., until a sufficient quantity of amino component has drawn on to the fibre. At this stage, the dyeing process is expediently interrupted, the treated material rinsed, dried intermediately if necessary, and subsequently introduced into a fresh bath containing the haloimine component in the form of an aqueous solution or dispersion. The goods are placed in this second bath at room temperature or at a slightly elevated temperature and dyeing is continued until the optimum depth of colour is achieved, if need be with an increase of temperature up to 140° C., for example. The fastness to rubbing of the dyeings thus obtainable can be improved by an after-treatment with alkaline reducing agents such as sulphites or formaldehyde/sulphite addition products in the presence of sodium hydroxide, frequently with the addition of an emulsifier, or by an after-treatment with oxidising agents such as $NaClO_2$ in the presence of acetic acid of low concentration.

A special method of carrying out the above mentioned processes consists in that the material padded in the first stage with the amino component is intermediately dried in a continuous process, then briefly thermofixed at an elevated temperature, preferably 200–210° C., and subsequently, if desired after soaping, treated in a dyebath or padding liquor with the haloimine or also with mixtures thereof.

When using salts of amino group-containing components it is necessary, in general, to liberate the bases during the dyeing process by the addition of suitable alkaline substances scuh as sodium carbonate, sodium bicarbonates, alkalies, alkali metal phosphates.

As dispersing or emulsifying agents which are advantageously added to the starting components or in the course of the dyeing processes described above, commercial products are suitable such as sulphite cellulose waste liquor products, condensation products from higher alcohols and ethylene oxide, soaps, polyglycol ethers of aromatic fatty acid amides, condensation products from aromatic sulphonic acids or mixtures of these compounds.

Suitable reducing substances possibly which can optionally be added to the amine component are inter alia sodium sulphide, sodium sulphite, sodium dithionite, sodium thiosulphate, hydroxylamine, hydrazine hydrate, hydrazine sulphate, sodium borohydride or mixtures of these compounds.

The dyeings obtained according to the new processes are distinguished by very good fastness properties, especially by excellent fastness to sublimation and very good fastness to light. Particularly noteworthy are the fast black shades obtained on materials of aromatic polyesters, especially fibres and fabrics of polyethylene terephthalates.

It is already known from German patent specification No. 1,079,587 that fast black dyeings can be obtained on polyester materials by causing aromatic mono- or polynuclear black bases suitable for oxidation dyeing to draw onto the materials and subsequently oxidising with chlorite in the presence of acid or with hypohalous acid or certain agents splitting off hypohalous acid, for example with N-chloro- or N-bromocarbamic acid ethyl ester, N-halogen compounds, preferably of cyclic imides such as N-bromosuccinimide, but particularly N-halogen compounds of sulphonamides, preferably those of the aromatic series, such as benzenesulphodichloramide, p-chlorobenzene-dichloramide and p-tolueneo sulphochloramide sodium salt. This process has the disadvantage of necessitating the work to be carried out with chlorine-yielding agents which moreover tend to hydrolysis under the influence of humidity already at room temperature, thus rendering the levelness of the resulting dyeings doubtful.

The new process obviates these disadvantages and, in addition, offers more advantageous possibilities of application on account of the comparatively substantially better stability of the starting components. The quinones and derivatives of quinones and quinone-imines which can be used for the present new processes are stable compounds which, for example, stand boiling for a half hour in an aqueous medium under conventional dyeing conditions without being modified; dichlorimides, for example, do not split off hypohalous acid under these conditions.

The following examples are given for the purpose of illustrating the invention.

*Example 1*

10 g. of polyethylene-glycol terephthalate fibre in the form of skein material are treated in a bath which contains in 200 ml. of water 0.8 g. of 4-amino-4'-methoxydiphenylamine, 0.8 g. of a conventional dispersing agent and 1 g. of sodium sulphide at 125° C. for an hour. After this time, the material is rinsed and after-treated in a fresh bath of 200 ml. of water containing 0.8 g. of N,N'-dicloroquinone-diimine at 125° C. for a half hour.

After the final reductive after-treatment, a black dyeing of outstanding fastness properties is obtained.

When instead of 1,4-quinone-dichlorodiimine, 1,4-naphthoquinone-dichlorodiimine is used, a black dyeing of good fastness properties is likewise obtained.

Example 2

5 g. of polyethylene-glycol terephthalate fibre in the form of skein material are treated, after a preliminary washing, in a bath which contains in 200 ml. of water 0.25 g. of 2,4-dinitro-4'-aminodiphenylamine, 0.2 g. of an anion-active alkyl phenyl-polyglycol ether sulphate, 2 g. of a mixture of disodium hydrophosphate and trisodium phosphate (in the ratio of 7:1) and 1 g. of trichlorobenzene, at boiling temperature for 1–1½ hours. After this time, the pre-dyed material is rinsed and after-treated in a fresh bath containing 1 g. of 2,5-dichloro-N,N'-dichloroquinone-diimine and 0.2 g. of a non-ionic alkyl-polyglycol ether at boiling temperature for 10 minutes.

In order to improve the fastness to rubbing, the dyed fibre is after-treated in a slightly boiling bath with 4 ml./litre of sodium hydroxide (38° Bé.), 2 g./litre of sodium bisulphite and 1 g./litre of a polyglycol ether of a fatty acid amide for 10–30 minutes and then rinsed.

A clear yellow-brown dyeing of good fastness properties is thus obtained.

Example 3

5 g. of the material mentioned in Example 2 are dyed in the manner there described, but with 0.5 g. of 4-aminodiphenylamine for 1–1½ hours. Further treatment for the development of the dyestuff is carried out with 1 g. of 2,6-dichloro-N-chloroquinone-imine or 1 g. of 2-chloro-N,N'-dichloroquinone diimine or 1 g. of 2-methyl-N,N'-dichloroquinone diimine and 0.2 g. of a non-ionic polyglycol ether of a fatty acid amide.

In order to improve the fastness to rubbing, the dyed fibre is after-treated in a slightly boiling bath with 4 ml./litre of sodium hydroxide (38° Bé.), 2 g./litre of sodium bisulphite and 1 g./litre of a polyglycol ether of a fatty acid amide for 10–30 minutes and subsequently rinsed. A deep black dyeing fast to sublimation is thus obtained.

A black dyeing with comparable fastness properties is obtained by using, instead of 0.5 g. of 4-aminodiphenylamine, a mixture of 0.25 g. each of 4-aminodiphenylamine and of 4'-cyclohexyl-4-aminodiphenylamine or by using instead of 2,6-dichloro-N-chloroquinone-imine 2,5-dichloro-N-bromoquinone-imine.

Example 4

5 g. of the material mentioned in Example 2 are dyed with 0.5 g. of 4-amino-diphenylamine sulfate for 1–1½ hours. The additives to the dyebath and dyeing conditions are the same as in Example 2. For further treatment, 2,5-dichloro-N,N'-dichloroquinone-diimine is used in this case.

A reductive after-treatment can be carried out as described in Example 2. A grey dyeing fast to sublimation is thus obtained.

Example 5

5 g. of the material mentioned in Example 2 are treated in a bath of 200 ml. of water with 0.5 g. of 4-amino-4'-methoxy-diphenylamine, 0.2 g. of an anion-active alkyl-phenyl-polyglycol ether sulfate, 0.25 g. of sodium carbonate and 1 g. of o-phenylphenol at boiling temperature for 1–1½ hours. After intermediate rinsing, the material is treated with 0.5 g. of N,N'-dichloro-naphthoquinone-diimine-(1,4) and 0.2 g. of a non-ionic alkyl-polyglycol ether in a bath of 200 ml. of water for 30 minutes. After a reductive after-treatment, a black dyeing of good fastness properties is obtained.

Example 6

10 g. of fibre fabric of polyethylene-glycol terephthalate are treated, after a preliminary washing, in a bath of 400 ml. of water containing 1 g. of 4-amino-4'-methoxy-diphenylamine sulphate, 0.5 g. of a weakly anion-active alkyl-phenyl-polyglycol ether sulphate, 4 g. of a mixture of disodium hydrogen phosphate and trisodium phosphate (in the ratio of 7:1) and 2 g. of trichlorobenzene, at boiling temperature for 2 hours. Subsequently, the material is rinsed and after-treated in a fresh bath with 1 g. of 2,5-dichloro-N,N'-dichloroquinone-diimine and 0.2 g. of a nonionic alkyl-polyglycol ether at boiling temperature for 30 minutes. A reductive after-treatment may follow.

A deep black dyeing of excellent fastness properties is thus obtained.

Example 7

5 g. of polyamide fibre are treated at boiling temperature in a bath of 200 ml. of water with 0.2 g. of 4-amino-4'-methoxydiphenylamine sulphate, 0.2 g. of a non-ionic alkyl-polyglycol ether and 2 g. of the mixture of di- and tri-sodium phosphate described in Example 2. After boiling for an hour and soaping, the dyestuff is developed on the fibre in a fresh bath of 200 ml. of water with 0.4 g. of 2,5-dichloro-N,N'-dichloroquinone-diimine and 0.2 g. of a non-ionic alkyl-polyglycol ether at boiling temperature for 20 minutes. A deep black dyeing of good fastness properties is thus obtained.

When instead of polyamide fibre, triacetate fibre is dyed according to the same instructions, a deep black dyeing of similarly good properties is likewise obtained.

Example 8

2.5 g. of polyacrylonitrile fibre are dyed by boiling in a bath of 200 ml. of water with 0.15 g. of 4-amino-4'-methoxydiphenylamine and 0.1 g. of 60% acetic acid for an hour and, after intermediate rinsing, the dyestuff is developed with 0.2 g. of 2,5-dichloro-N,N'-dichloroquinone-diimine and 0.1 g. of a non-ionic alkyl-polyglycol ether at boiling temperature for 20 minutes.

A grey dyeing of good fastness properties is thus obtained.

Example 9

5 g. of acetate fibre are dyed in a bath of 200 ml. of water with 0.25 g. of 4-amino-4'-methoxy-diphenylamine sulphate, 0.2 g. of a weakly anionic alkyl-phenyl-polyglycol ether sulphate, 4 g./litre of hydrazine hydrate and 2 g. of a mixture of di- and tri-sodium phosphate (ratio: 7:1) at 85° C. for an hour. After this time, the material is rinsed and the dyestuff developed with 0.2 g. of 2,5-dichloro-N,N'-dichloroquinone-diimine with the addition of 0.2 g. of a non-ionic alkyl-polyglycol ether at 85° C. for a half hour.

A deep black dyeing with good fastness properties is thus obtained.

Example 10

50 g. of polyethylene-glycol terephthalate fibre in the form of skein material applied to a cross-wound bobbin are treated in a bath which contains in 500 ml. of water 1 g. of sodium sulphite or the same amount of sodium hyposulphite or potassium borohydride, 4 g. of 4-amino-4'-methoxy-diphenylamine and 4 g. of a conventional non-ionic dispersing agent (e.g. a naphthalene-sulphonic acid/formaldehyde condensation product), at 110° C. for an hour. After this time, the pale brown-coloured material is rinsed and treated in a bath which contains in 500 ml. of water 4 g. of 2,5-dichloro-N,N'-dichloroquinone-diimine and 4 g. of a conventional dispersing agent (e.g. a naphthalene-sulphonic acid/formaldehyde condensation product) at 110° C. for 30 minutes. After a reductive after-treatment with 4 ml./litre of sodium hydroxide (38° Bé.), 2 g./litre of sodium bisulphite and 1 g./litre of a polyglycol ether of a fatty acid amide in a slightly boiling bath for 20 minutes and subsequent rinsing and acidification of the dyeing, a deep black dyeing of very good fastness properties is obtained.

Example 11

1 kg. of fibre fabric of polyethylene-glycol terephthalate are treated in a winch vat in a bath of 40 litres of water containing 60 g. of sodium sulphide, 200 g. of trichlorobenzene, 100 g. of 4-amino-diphenylamine and 100 g. of a dispersing agent at boiling temperature for 1–1½ hours. After this time, the yellow-brown coloured material is rinsed and treated in a bath which contains in 400 ml. of water 80 g. of N,N'-dichloroquinone-diimine-(1,4) and 80 g. of a non-ionic dispersing agent, at boiling temperature for 30 minutes.

After the after-treatment described in Example 2, a deep black dyeing of very good fastness properties is obtained.

Example 12

10 g. of triacetate fibre in the form of skein material are treated in a bath of 400 ml. of water containing 0.6 g. of 4-amino-4'-methoxy-diphenylamine, 0.3 g. of a dispersing agent and 2 g. of trichlorobenzene at boiling temperature for an hour. After intermediate rinsing of the material, the dyestuff is developed in a bath of 400 ml. of water containing 0.6 g. of 2,5-dichloro-N,N'-dichloroquinone-diimine and 0.6 g. of a dispersing agent by treating the material at boiling temperature for a half hour.

A black dyeing of very good fastness properties is thus obtained.

Example 13

10 g. of polyethylene-glycol terephthalate fibre in the form of skein material are treated in a bath which contains in 200 ml. of water 0.8 g. of 4-amino-4'-methoxy-diphenylamine, 0.8 g. of a conventional dispersing agent and 1 g. of sodium sulphide, at 125° C. for an hour. After this time, the material is rinsed and after-treated in a fresh bath of 200 ml. of water containing 0.8 g. of N,N'-dichloroquinone-diimine-(1,4) at 125° C. for a half hour.

After a final reductive after-treatment, a black dyeing of excellent fastness properties is obtained.

When using, instead of N,N'-dichloroquinone-diimine-(1,4), N,N' - dichloro-naphthoquinone - diimine-(1,4), a black dyeing of good fastness properties is likewise obtained.

Instead of the above mentioned diphenylamine derivative the following amines may be used with likewise very good results: N,N'-bis-(4-aminophenyl)4,4'-diamino-diphenylether, N,N'-bis-(4-aminophenyl) - 4,4'-diamino-stilbene, N,N'-bis-(4-aminophenyl) - 4,4'-diamino-3,3'-di-methoxy-diphenyl, N,N'-bis - (4-aminophenyl) - 4,4'-diamino-diphenylmethane, 4,4'-diamino-stilbene or N,N-bis-(p-aminophenyl)-4,4'-diamino-diphenylamine.

Example 14

500 g. of combed material of polyethylene glycol terephthalate fibres are treated for 1–1½ hours at 110° C. in an aqueous bath of 10 l. of water containing 45 g. of 4-aminodiphenylamine, 50 g. of a common non-ionic dispersing agent, e.g. a naphthalene sulfonic acid formaldehyde condensation product, and 15 to 20 g. of sodium sulfide. The fabric is then rinsed with water and the dyeing developed in a bath of 10 l. of water which contains 45 g. of N-methyl-N'-chloro-p-benzoquinone-diimine and 50 g. of a naphthalene sulfonic acid formaldehyde condensation product for 30 to 45 minutes at 110° C.

In order to improve the fastness to rubbing the dyed fibre is after-treated in a slightly boiling bath with 4 ml. per litre of sodium hydroxide (38° Bé.), 2 g. per litre of sodium bisulfite and 1 g. per litre of a polyglycol ether of a fatty acid amide, for 10 to 30 minutes and subsequently rinsed.

A deep black dyeing is thus obtained which possesses excellent fastness properties.

Example 15

If in Example 6 the dyestuff is developed with instead of 1 g. of 2,5-dichloro-N,N'-p-dichloroquinone-diimine the same amount of N,N'-dichloro-diphenyl-p-quinone a similar black dyeing with good fastness properties can be obtained.

In the preceding Examples the expression "quinone" stands, if not otherwise stated, for "p-benzoquinone."

What is claimed:

1. A process for coloring a hydrophobic fibrous material, which comprises:
    (A) contacting the fibrous material with an amino group containing carbocyclic compound selected from the class consisting of:
        4-amino-diphenylamine,
        4-amino-4'-methoxy-dihpenylamine,
        3-methoxy-4-aminodiphenylamine,
        4-amino-4'-cyclohexyl-diphenylamine,
        4-amino-4'-methyl-diphenylamine,
        4-amino-4'-naphthyl-diphenylamine,
        2,4-diamino-diphenylamine,
        4-benzoylamido-2,5-dimethoxy-1-aminobenzene,
        2,4-dinitro-4'-aminodiphenylamine,
        N,N'-bis-)4-aminophenyl)-4,4'-diamino-diphenyl amine,
        N,N'-bis-(4-aminophenyl)-4,4'-diamino-diphenyl-ether,
        N,N'-bis-(4-aminophenyl)-4,4'-diamino-diphenyl-methane,
        N,N'-bis-(4-aminophenyl)-diamine stilbene,
        N,N'-bis-(4-aminophenyl),4,4'-diamino-3,3'-dimethoxy-diphenyl,
        4,4'-diamino-stilbene,
        1-amino-4-phenylaminonaphthalene,
        4,4'-diamino-azobenzene,
        1,amino-4-(p-cyclohexylphenyl)-aminobenzene,
        4-(p-aminophenyl)-aminodiphenyloxide,
        4-amino-2'-methoxy-diphenylamine,
        and their salts.
    (B) contacting in a second step, said fibrous material with a mononuclear N-haloquinone selected from the group consisting of an N-haloquinone imine and an N,N'-dihaloquinone-diimine.

2. The process of claim 1 wherein the hydrophobic fibrous material is polyethylene terephthalate.

3. The process of claim 1 wherein the amino group-containing carbocyclic compound is initially applied as a salt and the amine is liberated by the addition of an alkali metal compound.

4. The process of claim 1 which incorporates a drying step between the two contacting steps.

5. The process of claim 1 wherein the contacting steps are carred out at a temperature from about room temperature to about 140° C.

6. The process of claim 1 wherein the temperature is adjusted to about 60° to about 140° C. after the two contacting steps have been completed.

7. The process of claim 1 wherein the amino group-containing carbocyclic compound is thermofixed at a temperature from about 200° to about 210° C. prior to the second contacting step.

8. The process of claim 1 wherein the amino group-containing carbocyclic compound is selected from the group consisting of 4-amino-4'-methoxydiphenylamine, 1-amino-4-phenylaminonaphthalene, 4,4'-diamino-azobenzene, 1 - amino - 4 - (p - cyclohexylphenyl) - aminobenzene, 4 - (p - aminophenyl) - aminodiphenyloxide, 4-amino - 2' - methoxy - diphenylamine, 4 - aminodiphenylamine, and their salts.

9. The process of claim 1 wherein the fibrous material is contacted with a mixture of amino group-containing carbocyclic compounds.

10. The process of claim 1 wherein reducing means to prevent the oxidation of the amino group-containing carbocyclic compound is incorporated.

11. Hydrophobic fibrous materials colored according to the process of claim 1.

12. Polyethylene terephthalate fibres colored by the process of claim 1.

13. The process of claim 1 wherein an amino group-containing carbocyclic compound containing the radical

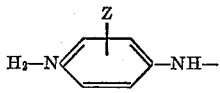

wherein Z stands for a member selected from the class consisting of hydrogen, —OCH$_3$, and —NH$_2$ is applied in a first step, and in a second step at least one compound selected from the class consisting of a quinone, a mononuclear N-haloquinone imine and a mononuclear N,N'-dihaloquinone-diimine is applied.

14. The process of claim 1 wherein the N-haloquinone is selected from the group consisting of

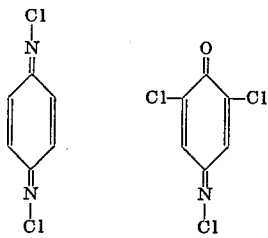

and

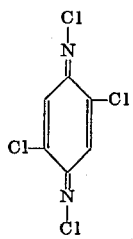

15. The process of claim 14 wherein the amino group-containing carbocyclic compound is selected from the group consisting of 4-amino-4'-methoxydiphenylamine, 1-amino-4-phenylaminonaphthalene, 4,4'-diaminoazobenzene, 1-amino-4-(p-cyclohexylphenyl)-amino-benzene, 4-p - aminophenyl) - amino - diphenyloxide, 4 - amino - 2-methoxy - diphenylamine, 4 - aminodiphenylamine, and their salts.

16. The process of claim 14 wherein the N-haloquinone is N,N'-dichloroquinone-diimine and the amino group-containing carbocyclic compound is 4-amino-diphenylamine.

17. The process of claim 14 wherein the N-haloquinone is N,N'-dichloroquinone-diimine and the amino group-containing carbocyclic compound is 4 - amino - 4' - methoxydiphenylamine.

18. The process of claim 14 wherein the N-haloquinone is N,N' - 2,5 - tetrachloroquinone - diimine - 1,4 and the amino group-containing carbocyclic compound is 4-amino-4'-methoxydiphenylamine.

References Cited by the Examiner

UNITED STATES PATENTS

| | | | |
|---|---|---|---|
| 2,086,337 | 7/1937 | Schirm | 8—39 |
| 2,926,060 | 2/1960 | Lehman | 8—32 X |
| 3,005,677 | 10/1961 | Weis | 8—32 |
| 3,036,875 | 5/1962 | Schlack | 8—55 |
| 3,058,797 | 10/1962 | Gies et al. | 8—1 |

FOREIGN PATENTS

| | | |
|---|---|---|
| 16,189 | 1907 | Great Britain. |
| 23,193 | 1904 | Great Britain. |
| 307,391 | 10/1955 | Japan. |

OTHER REFERENCES

Shinomiya et al.: Chem. Abst., 1958, vol 52, column 737(d).

NORMAN G. TORCHIN, *Primary Examiner.*

T. J. HERBERT, *Assistant Examiner.*